United States Patent
Ogawa et al.

(10) Patent No.: US 9,376,950 B2
(45) Date of Patent: Jun. 28, 2016

(54) REDUCING AGENT TANK AND WORK VEHICLE

(71) Applicant: KOMATSU LTD., Tokyo (JP)

(72) Inventors: Satoshi Ogawa, Osaka (JP); Taisuke Kusaba, Hirakata (JP); Masatoshi Kajiya, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/359,445

(22) PCT Filed: Jan. 8, 2014

(86) PCT No.: PCT/JP2014/050121
§ 371 (c)(1),
(2) Date: May 20, 2014

(87) PCT Pub. No.: WO2014/192319
PCT Pub. Date: Dec. 4, 2014

(65) Prior Publication Data
US 2015/0192051 A1    Jul. 9, 2015

(51) Int. Cl.
*F01N 3/00*   (2006.01)
*F01N 3/20*   (2006.01)
(Continued)

(52) U.S. Cl.
CPC ............ *F01N 3/2066* (2013.01); *B01D 35/005* (2013.01); *B01D 35/027* (2013.01); *B01D 35/0273* (2013.01); *B01D 35/26* (2013.01); *F01N 3/035* (2013.01);
(Continued)

(58) Field of Classification Search
CPC ... F02D 41/029; F02D 41/0275; F01N 1/002; F01N 3/0842; F01N 3/035; F01N 3/0841; F01N 3/2066; F01N 13/082; F01N 13/02

USPC .................................................... 60/295, 301
See application file for complete search history.

(56) References Cited

U.S. PATENT DOCUMENTS 2,788,125 A * 4/1957 Webb .......................... 210/172.4
3,833,124 A * 9/1974 Sugiyama et al. ............ 210/460
(Continued)

FOREIGN PATENT DOCUMENTS

CN        101663470 A    3/2010
CN        101806238 A    8/2010
(Continued)

OTHER PUBLICATIONS

Machine Translation of FR 2775735, Translated on Jul. 9, 2015.*

*Primary Examiner* — Patrick Maines
(74) *Attorney, Agent, or Firm* — Drinker Biddle & Reath LLP

(57) ABSTRACT

A container main body of a reducing agent tank stores a reducing agent. A suction pipe has a suction port positioned in the container main body, and guides the reducing agent from the suction port to outside of the container main body. The strainer is provided at the suction port of the suction pipe. The strainer includes a surrounding portion and a facing portion. The surrounding portion has a filter portion which surrounds an internal space to partition the internal space and an external space of the strainer and allows the reducing agent to pass through between the internal space and the external space. The facing portion extends into the internal space of the surrounding portion to face with the filter portion through a gap space communicating with the suction port in the internal space and partition the gap space and the external space.

9 Claims, 12 Drawing Sheets

(51) Int. Cl.
  *B01D 35/00* (2006.01)
  *B01D 35/027* (2006.01)
  *B01D 35/26* (2006.01)
  *F01N 3/035* (2006.01)
  *B01D 53/94* (2006.01)

(52) U.S. Cl.
  CPC ........ *B01D 53/9418* (2013.01); *F01N 2590/08* (2013.01); *F01N 2610/02* (2013.01); *F01N 2610/1406* (2013.01); *F01N 2610/1426* (2013.01); *Y02T 10/24* (2013.01)

(56) References Cited

U.S. PATENT DOCUMENTS

| | | | | |
|---|---|---|---|---|
| 3,900,397 | A * | 8/1975 | Bell | 210/128 |
| 4,411,788 | A * | 10/1983 | Kimura | 210/439 |
| 4,561,977 | A * | 12/1985 | Sasaki | 210/356 |
| 6,440,305 | B1 * | 8/2002 | Donnerdal et al. | 210/342 |
| 7,207,320 | B2 * | 4/2007 | Ikeya | 123/509 |
| 2006/0107638 | A1 * | 5/2006 | Holzmann et al. | 55/498 |
| 2012/0031083 | A1 * | 2/2012 | Minami et al. | 60/297 |
| 2012/0036838 | A1 | 2/2012 | Furuya | |
| 2012/0183459 | A1 * | 7/2012 | Rocheux et al. | 423/212 |
| 2014/0158607 | A1 * | 6/2014 | Xia et al. | 210/435 |

FOREIGN PATENT DOCUMENTS

| | | | |
|---|---|---|---|
| CN | 103161629 A | 6/2013 | |
| FR | 2 775 735 A1 | 9/1999 | |
| FR | 2775735 A1 * | 9/1999 | ............ F02M 37/22 |
| JP | S60-129111 A | 7/1985 | |
| JP | S62-186053 A | 8/1987 | |
| JP | H11-19416 A | 1/1999 | |
| JP | H11-094160 A | 4/1999 | |
| JP | 1972734 A | 5/2007 | |
| JP | 2010-164014 A | 7/2010 | |
| JP | 2010-255521 A | 11/2010 | |
| JP | 2011-137441 A | 7/2011 | |
| JP | 2013-160057 A | 8/2013 | |
| WO | WO-2010/119711 A1 | 10/2010 | |

* cited by examiner

REDUCING AGENT TANK AND WORK VEHICLE

TECHNICAL FIELD

The present invention relates to a reducing agent tank and a work vehicle.

BACKGROUND ART

Work vehicles such as a hydraulic excavator, a bulldozer, a wheel loader, and the like have an exhaust gas treatment device. For example, a diesel particulate filter device (DPF), a diesel oxidation catalyst device (DOC), a selective catalytic reduction device (SCR), and the like are available as exhaust gas treatment devices.

Particularly, the selective catalytic reduction device uses urea as a precursor of a reducing agent to reduce $NO_x$ (nitrogen oxide) contained in an exhaust gas and purify the exhaust gas. The reducing agent (aqueous urea solution) utilized in this exhaust gas treatment is supplied from a reducing agent tank to a reducing agent injection device through a reducing agent pipe. When the reducing agent remains in the reducing agent pipe after an engine is stopped, the reducing agent may be solidified in the pipe to cause clogging in the pipe.

Therefore, a process of collecting the reducing agent from the reducing agent pipe into the reducing agent tank (purge process) after stopping the engine is performed. In this purge process, the residual reducing agent in the reducing agent pipe as well as bubbles are collected into the reducing agent tank.

On the other hand, since the work vehicle is used under a harsh condition with much dust present, it is highly possible that impurities are entrained in the reducing agent tank, thus it is necessary to remove the impurities. A strainer is provided at a suction port for the reducing agent in the reducing agent tank to remove the impurities. A reducing agent tank provided with a filter as such a strainer at a suction port is disclosed in, for example, Japanese Patent Laying-Open No. 2011-137441.

CITATION LIST

Patent Document

PTD 1: Japanese Patent Laying-Open No. 2011-137441

SUMMARY OF INVENTION

Technical Problem

When the purge process described above is performed in the reducing agent tank provided with the strainer, bubbles remain in the strainer. Therefore, when a volume of an internal space of the strainer is large, many bubbles remain in the internal space. Accordingly, when the reducing agent is sucked into the reducing agent pipe at the time of restarting the engine, a large amount of bubbles are sucked into the reducing agent pipe to thereby cause a suction defect of the reducing agent into the reducing agent pipe and in turn lead to an operation defect of a reducing agent pump.

On the other hand, when an attempt is made to simply reduce a volume of the internal space of the strainer, a surface area of a filter portion is reduced, so that the flow rate of the reducing agent is affected.

The present invention was made in view of the problem described above, and its object is to provide a reducing tank and a work vehicle capable of suppressing the suction defect of the reducing agent caused by bubbles and securing a large surface area of the filter portion.

Solution to Problem

A reducing agent tank of the present invention includes a container main body, a pipe, and a strainer. The container main body stores a reducing agent. The pipe includes a suction port positioned in the container main body and guides the reducing agent from the suction port to outside of the container main body. The strainer is provided at the suction port of the pipe. The strainer includes a surrounding portion and a facing portion. The surrounding portion has a first filter portion which surrounds an internal space of the strainer to partition the internal space and an external space of the strainer and allows the reducing agent to pass through between the internal space and the external space. The facing portion extends into the internal space of the surrounding portion to face with the first filter portion through a gap space communicating with the suction portion in the internal space and partition the gap space and the external space.

In the present description, the reducing agent and a precursor of the reducing agent are collectively referred to as "reducing agent."

According to the reducing agent tank of the present invention, the facing portion extends into the internal space of the surrounding portion. Accordingly, a volume of the gap space sandwiched between the facing portion and the surrounding portion can be reduced. Therefore, the amount of bubbles remaining in the gap space of the strainer during the purge process can be reduced. Thus, when the reducing agent is sucked into the suction port at the time of restarting the engine, suction of a large amount of bubbles into the suction port is suppressed, so that the suction defect of the reducing agent can be suppressed.

Further, it is all necessary to extend the facing portion into the internal space of the surrounding portion to reduce the volume of the gap space. Therefore, there is no need to reduce a size of the surrounding portion itself. Accordingly, a large surface area of the first filter portion formed in the surrounding portion can be secured, so that the flow rate of the reducing agent is not affected.

With the matters described above, the suction defect of the reducing agent can be suppressed, and a large surface area of the filter portion can be secured.

In the reducing agent tank described above, the facing portion has a second filter portion which allows the reducing agent to pass through between the gap space and the external space. Accordingly, an area of the filter portion can be further increased.

In the reducing agent tank described above, the surrounding portion has a through hole which connects the suction port and the gap space. The facing portion has a tapered portion which is so shaped that a size of the gap space between the surrounding portion and the facing portion increases as proceeding closer to the through hole along an extending direction of the through hole. Accordingly, a flow path resistance of the reducing agent in a periphery of the through hole connected to the suction port can be reduced, so that the reducing agent can flow smoothly to the suction port.

In the reducing agent tank described above, the first filter portion is arranged so as to surround a periphery of the gap space. Accordingly, the area of the filter portion can be further increased.

In the reducing agent tank described above, the surrounding portion has a peripheral portion which surrounds a periphery of the internal space and a bottom portion which closes one end of the peripheral portion. An opening portion is formed at the other end of the peripheral portion. The facing portion has a cover portion which is attached to the other end, and a projecting portion which extends from the cover portion into the internal space. The gap space is positioned between a whole circumference of the projecting portion from a portion at which the projecting portion is connected to the cover portion to the leading end portion of the projecting portion and the peripheral portion, and between the leading end portion and the bottom portion. A dimension of the gap space between the leading end portion and the bottom portion is smaller than a thickness of the bottom portion. Accordingly, a dimension of the gap space between the leading end portion and the bottom portion can be further reduced.

In the reducing agent tank described above, a dimension of the projecting portion in a radial direction is larger than or equal to a half of a dimension of the peripheral portion in a radial direction. Accordingly, a volume of the gap space can be set smaller.

A work vehicle of the present invention includes an engine, an exhaust gas treatment device, a reducing agent tank, and a reducing agent injection device. The exhaust gas treatment device performs treatment to an exhaust gas from the engine by a reductive reaction. The reducing agent tank is any one of the reducing agents described above. The reducing agent injection device injects the reducing agent sucked out from the reducing agent tank to the exhaust gas guided to the exhaust gas treatment device.

According to the work vehicle of the present invention, the reducing agent tank described above is provided. Therefore, the suction defect of the reducing agent can be suppressed, and the flow rate of the reducing agent is not affected by the reduced surface area of the filter portion. Therefore, the reductive reaction of the exhaust gas in the exhaust gas treatment device can be performed more appropriately.

Advantageous Effects of Invention

As described above, according to the present invention, a reducing agent tank and a work vehicle can be achieved which are capable of suppressing the suction defect of the reducing agent due to bubbles and securing a large surface area of the filter portion.

DESCRIPTION OF EMBODIMENT

Hereinafter, an embodiment will be described with reference to the drawings.

Firstly, a configuration of a hydraulic excavator will be described with reference to FIG. 1, as one example of work vehicles according to the embodiment of the present invention. It should be noted that the present invention is applicable to work vehicles such as a wheel loader, a bulldozer, and the like provided with an engine unit including an exhaust gas treatment unit.

Figure 1:
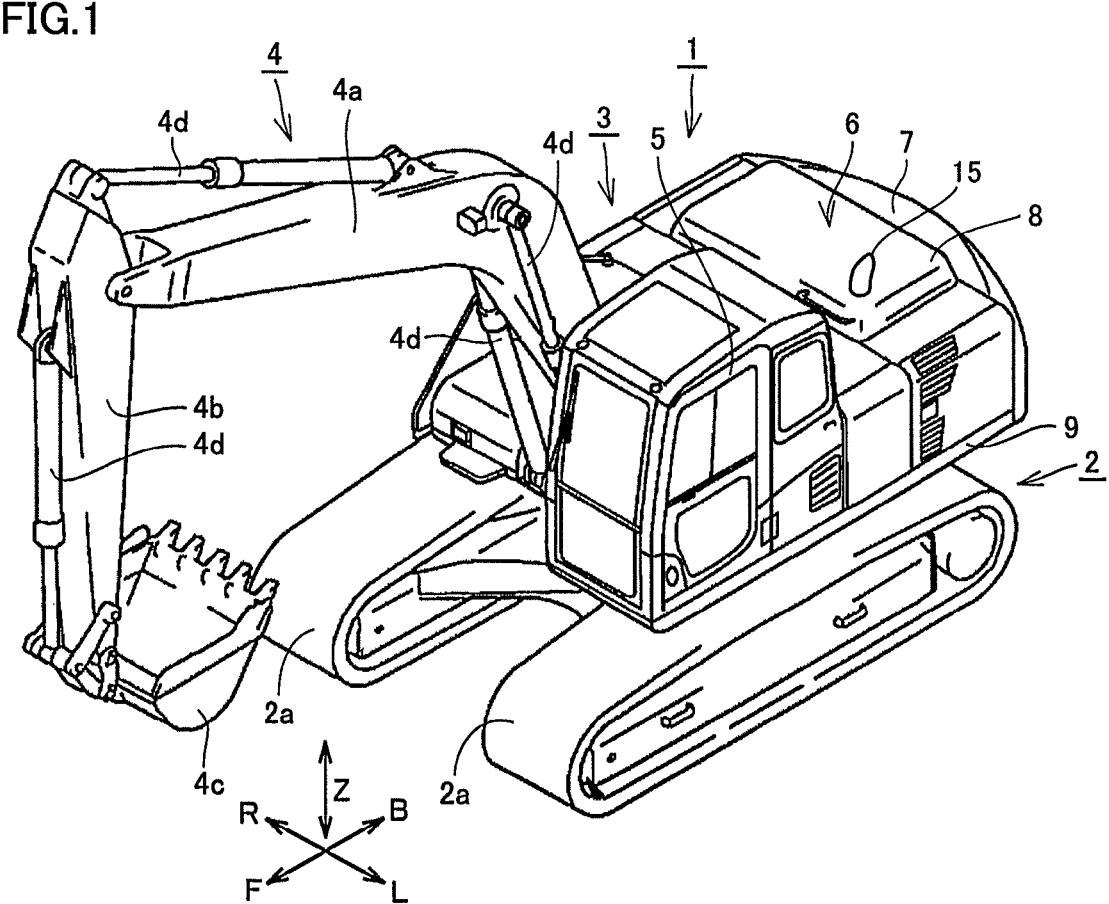
FIG. 1 is a perspective view schematically representing a configuration of a work vehicle according to one embodiment of the present invention.

FIG. 1 is a perspective view schematically representing a configuration of a work vehicle according to one embodiment of the present invention. Referring to FIG. 1, hydraulic excavator 1 mainly includes a lower travelling unit 2, an upper revolving unit 3, and a work implement 4. Lower travelling unit 2 and upper revolving unit 3 constitute a work vehicle main body.

Lower travelling unit 2 includes a pair of left and right crawler belts 2*a*. Lower travelling unit 2 is configured to be self-propelled by rotation of the pair of crawler belts 2*a*. Upper revolving unit 3 is freely-revolvably mounted on lower travelling unit 2.

Upper revolving unit 3 has on a left side L in a front side F (vehicle front side) a cab 5 constituting a space for allowing an operator to operate hydraulic excavator 1. Upper revolving unit 3 has in a back side B (vehicle back side) an engine compartment 6 for accommodating an engine, and a counter weight 7.

In the present embodiment, in the state where an operator is seated in cab 5, a front side (front face side) of the operator is referred to as a front side F of upper revolving unit 3, and the opposite side therefrom, in other words, a back side of the operator is referred to as a back side B of upper revolving unit 3. A left side of the operator in the seated state is referred to as a left side L of upper revolving unit 3, and a right side of the operator is referred to as a right side R of upper revolving unit 3. Further, upward and downward directions of the operator are denoted by the arrow Z in the drawings. In the following, the front/back and left/right directions of upper revolving unit 3 are assumed to be matched with the front/back and left/right directions of the work vehicle.

Upper revolving unit 3 has a revolving frame 9. Revolving frame 9 is included in a work vehicle main body. Revolving frame 9 is arranged above lower travelling unit 2 and provided to be freely revolvable with respect to lower travelling unit 2. Work implement 4, cab 5, and counter weight 7 are mounted on revolving frame 9 and arranged on an upper face of revolving frame 9.

Hydraulic excavator 1 includes a revolving device, which is not illustrated in the drawings, for allowing upper revolving unit 3 to revolve relative to lower travelling unit 2. The revolving device is constituted of a revolving motor supported by lower travelling unit 2, gears supported by revolving frame 9, and the like.

Work implement 4 which performs operation such as excavating earth is axially supported by upper revolving unit 3 so as to be operable in upward and downward directions Z. Work implement 4 has a boom 4a attached to an approximately central portion in front side F of upper revolving unit 3 so as to be operable in upward and downward directions Z, an arm 4b attached to a leading end portion of boom 4a so as to be operable in forward and backward directions F, B, and a bucket 4c attached to a leading end portion of arm 4b so as to be operable in forward and backward directions F, B. Boom 4a, arm 4b, and bucket 4c are configured so as to be driven respectively by a hydraulic cylinder 4d.

Work implement 4 is provided, for example, on right side R relative to cab 5. Relative to cab 5 arranged on left side L in front side F of upper revolving unit 3, work implement 4 is provided on right side R of cab 5 which is one side of cab 5. The arrangement of cab 5 and work implement 4 is not limited to the example shown in FIG. 1. For example, work implement 4 may be provided on the left side L of cab 5 which is arranged on the front right side F, R of upper revolving unit 3.

Engine compartment 6 is provided above revolving frame 9 so as to be adjacent to front side F of counter weight 7. Revolving frame 9 forms a floor portion of engine compartment 6. Engine compartment 6 is covered with an engine hood 8 from an upper side. Engine hood 8 forms a ceiling portion of engine compartment 6. Counter weight 7 is arranged on back side B of engine compartment 6 and forms a wall of back side B of engine compartment 6.

Counter weight 7 is provided at a back end portion of revolving frame 9 to retain a vehicle balance of hydraulic excavator 1 during excavation and the like. Counter weight 7 is provided at back side B of engine compartment 6 on revolving frame 9. Counter weight 7 is formed, for example, by placing scrap iron and concrete in a box formed by assembling steel plates. The back face of counter weight 7 constitutes a surface of back side B of hydraulic excavator 1 and has a smoothly curved shape.

Next, a path of a reducing agent pipe from a reducing agent tank to an exhaust gas treatment unit in the work vehicle of the present embodiment will be described with reference to FIG. 2.

Figure 2:
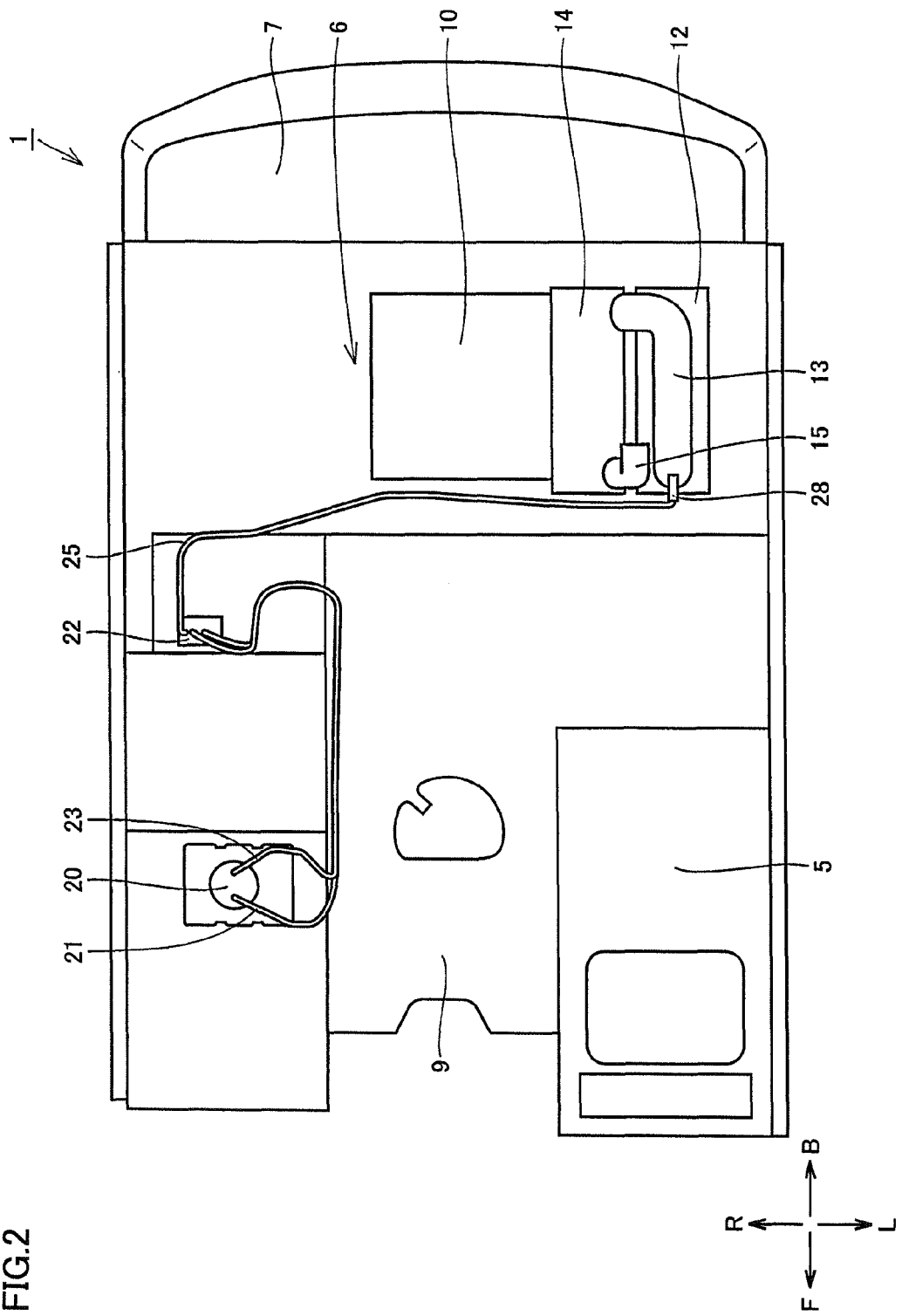
FIG. 2 is a plan view representing a path of a reducing agent pipe from a reducing agent tank to an exhaust gas treatment unit on a revolving frame in the work vehicle shown in FIG. 1.

FIG. 2 is a plan view showing a path of the reducing agent pipe from the reducing agent tank to the exhaust gas treatment unit on revolving frame 9 in work vehicle (hydraulic excavator) 1 shown in FIG. 1. Referring to FIG. 2, hydraulic excavator 1 includes an engine 10 which is a power source for driving lower travelling unit 2 and work implement 4. Engine 10 is mounted on revolving frame 9. Engine 10 is accommodated in engine compartment 6.

Hydraulic excavator 1 includes in engine compartment 6 an exhaust gas treatment unit for treatment of exhaust gas discharged from engine 10. The exhaust gas treatment unit is arranged above engine 10 and mainly includes exhaust gas treatment devices 12, 14, an intermediate connection pipe 13, an exhaust cylinder 15, and an injection device 28 for the reducing agent.

Exhaust gas treatment device 12 is connected to engine 10 by an exhaust pipe 11 (FIG. 3) which will be described later. Exhaust gas treatment device 14 is connected to exhaust gas treatment device 12 by intermediate connection pipe 13. In other words, with respect to a flow of discharging of the exhaust gas from engine 10, exhaust gas treatment device 12 is arranged on a downstream side of engine 10, and exhaust gas treatment device 14 is arranged on a downstream side of exhaust gas treatment device 12.

In the present embodiment, exhaust gas treatment device 12 is, for example, a diesel particulate filter device, and exhaust gas treatment device 14 is, for example, a selective catalytic reduction device. Further, intermediate connection pipe 13 is, for example, a mixing pipe.

Diesel particulate filter device 12 is a device which performs treatment to exhaust gas from engine 10, and mainly includes a filter (not illustrated in the drawing) and a heater (not illustrated in the drawings) attached to the filter. Diesel particulate filter device 12 is configured to collect particulates contained in the exhaust gas of engine 10 by means of the filter and burn the collected particulates. The filter is made of, for example, ceramic.

Selective catalytic reduction device 14 is a device which performs treatment to the exhaust gas from engine 10, and uses ammonia, which is obtained for example by hydrolyzing an aqueous urea solution, as a reducing agent to reduce nitrogen oxide $NO_x$. Selective catalytic reduction device 14, in principle, applies the reduction through a chemical reaction of ammonia ($NH_3$) with nitrogen oxide ($NO_x$) into nitrogen ($N_2$) and water ($H_2O$).

Mixing pipe 13 provides connection between diesel particulate filter device 12 and selective catalytic reduction device 14. In other words, diesel particulate filter device 12 and selective catalytic reduction device 14 are connected by mixing pipe 13. This mixing pipe 13 is a portion for injecting a reducing agent (for example, aqueous urea solution) to the exhaust gas which flows from diesel particulate filter device 12 to selective catalytic reduction device 14, and mixing urea with the exhaust gas.

Injection device 28 is provided at mixing pipe 13 to inject the reducing agent into mixing pipe 5. Injection device 28 is connected on a relatively upstream side of a path in mixing pipe 13, in other words, connected to mixing pipe 13 near a connection portion between mixing pipe 13 and exhaust gas treatment device 12.

Exhaust cylinder 15 is connected to selective catalytic reduction device 14 and discharges exhaust gas to an atmosphere after the exhaust gas has passed through diesel particulate filter device 12 and selective catalytic reduction device 14. This exhaust cylinder 15 protrudes upward from engine hood 8 as shown in FIG. 1. Accordingly, the exhaust gas treatment unit is configured to discharge the exhaust gas discharged from engine 10 to outside of hydraulic excavator 1 through exhaust gas treatment devices 12, 14 sequentially.

Hydraulic excavator 1 includes a reducing agent supply portion for supplying the reducing agent to the exhaust gas treatment unit (for example, injection device 28). The reducing agent supply portion mainly includes a reducing agent tank 20, a reducing agent pump 22, and reducing agent pipes 21, 23, 25 for allowing the reducing agent to pass through.

Reducing agent tank 20 and reducing agent pump 22 are mounted on revolving frame 9, particularly on a side frame on right side R. Reducing agent pump 22 is arranged more on front side F than engine compartment 6. Reducing agent tank 20 is arranged more on front side F than reducing agent pump 22.

Reducing agent tank 20 stores the reducing agent to be injected by injection device 28. Ammonia may be stored as a reducing agent in reducing agent tank 20. However, in place of ammonia, reducing agent tank 20 stores, for example, an aqueous urea solution. It should be noted that the reducing agent is not limited to the aqueous urea solution and is all necessary to be the agent capable of reducing nitrogen oxide $NO_x$.

Reducing agent pipes 21, 23, 25 include a feed pipe 21, a return pipe 23, and a pressure feed pipe 25. Reducing agent tank 20 and reducing agent pump 22 are coupled to one another by feed pipe 21 and return pipe 23. Feed pipe 21 is a pipe for feeding the reducing agent from reducing agent tank 20 to reducing agent pump 22. Return pipe 23 is a pipe for returning the reducing agent from reducing agent pump 22 to reducing agent tank 20. Reducing agent pump 22 and injection device 28 are coupled to one another by a pressure feed pipe 25. Pressure feed pipe 25 is a pipe for transferring the reducing agent from reducing agent pump 22 to injection device 28.

The reducing agent transferred from reducing agent tank 20 to reducing agent pump 22 via feed pipe 21 is branched off into two paths at reducing agent pump 22. The reducing agent which is not used for the exhaust gas treatment returns from reducing agent pump 22 to reducing agent tank 20 via return pipe 23. The reducing agent which is used for the exhaust gas treatment reaches injection device 28 from reducing agent pump 22 via pressure feed pipe 25 and is sprayed from injection device 28 into exhaust pipe 13.

Next, a path of a medium for heat exchange and a path of the reducing agent in the work vehicle of the present embodiment will be described with reference to FIG. 3.

Figure 3:
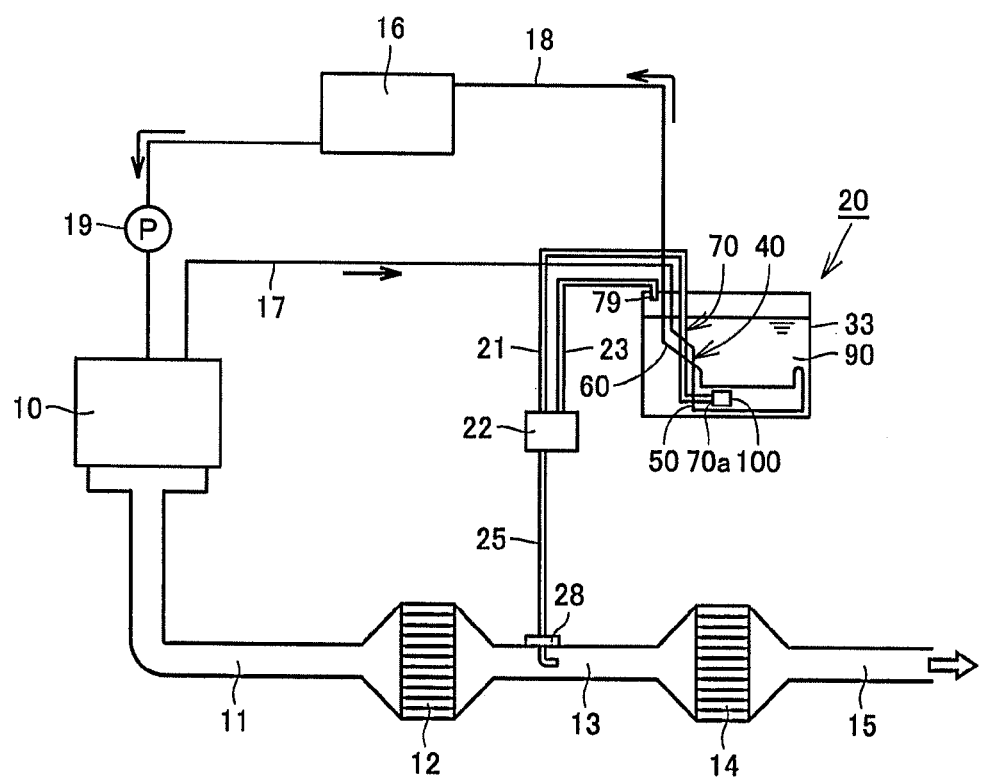
FIG. 3 is a functional diagram schematically representing a path of a reducing agent, a path of a medium for heat exchange, and an exhaust path of exhaust gas from an engine in the work vehicle shown in FIG. 1.

FIG. 3 is a functional diagram schematically representing a path of the reducing agent, a path of the medium for heat exchange, and an exhaust path of the exhaust gas from the engine in the work vehicle of the present embodiment. Referring to FIG. 3, the exhaust gas discharged from engine 10 sequentially flows through exhaust pipe 11, exhaust gas treatment device 12, intermediate connection pipe 13, and exhaust gas treatment device 14, and then is discharged to outside of the vehicle from exhaust cylinder 15. Injection device 28 is provided at intermediate connection pipe 13.

Reducing agent tank 20 has a container main body 33 for storing a reducing agent 90. In container main body 33, a suction pipe 70 is arranged. This suction pipe 70 has a suction port 70a located in container main body 33 and guides reducing agent 90 from suction port 70a to outside of container main body 33. A strainer 100 is provided at suction port 70a of suction pipe 70. Suction pipe 70 is connected to feed pipe 21.

Reducing agent 90 in container main body 33 is sucked into suction port 70a of suction pipe 70 through strainer 100 by a suction force of reducing agent pump 22. Reducing agent 90 sucked into suction port 70a is sucked from reducing agent tank 20 through suction pipe 70, and thereafter reaches injection device 28 via feed pipe 21 and pressure feed pipe 25 sequentially. Reducing agent 90 which is not used in the exhaust gas treatment returns from reducing agent pump 22 to container main body 33 of reducing agent tank 20 via return pipe 23.

Injection device 28 injects reducing agent 90 sucked out from reducing agent tank 20 into intermediate connection pipe 13. Accordingly, reducing agent 90 is supplied to the exhaust gas flowing in intermediate connection pipe 13, and nitrogen oxide contained in the exhaust gas reacts with reducing agent 90 in exhaust gas treatment device 14. Accordingly, a concentration of nitrogen oxide in the exhaust gas is reduced.

In the case where reducing agent 90 is an aqueous urea solution, the aqueous urea solution is dissolved and changed into ammonia in intermediate connection pipe 13, so that nitrogen oxide is dissolved into harmless nitrogen and oxygen by a reaction of nitrogen oxide with ammonia. The exhaust gas having the amount of nitrogen oxide lowered to an appropriate value is discharged from exhaust cylinder 15.

In container main body 33 of reducing agent tank 20, a heat exchanger 40 is arranged. A medium (heat exchange medium) for heat exchange with reducing agent 90 flows in heat exchanger 40. For this medium, cooling water of engine 10 is used. One end of heat exchanger 40 is connected to cooling water pipe 17, and the other end of heat exchanger 40 is connected to cooling water pipe 18. Radiator 16 and cooling water pump 19 are connected between cooling water pipe 18 and engine 10.

Driving of cooling water pump 19 causes the cooling water of engine 10 to flow through engine 10, heat exchanger 40, radiator 16, and cooling water pump 19 sequentially for circulation. The cooling water heated in engine 10 undergoes heat exchange with reducing agent 90 at heat exchanger 40 so as to be cooled. On the other hand, reducing agent 90 receives heat from the cooling water so as to be heated. Radiator 16 is a heat exchanger for cooling the cooling water by performing heat exchange between the cooling water and air. The cooling water cooled in radiator 16 flows to a water jacket of engine 10, so that engine 10 is cooled appropriately.

Next, a configuration of reducing agent tank 20 will be described in detail with reference to FIGS. 4 and 5.

Figure 4:
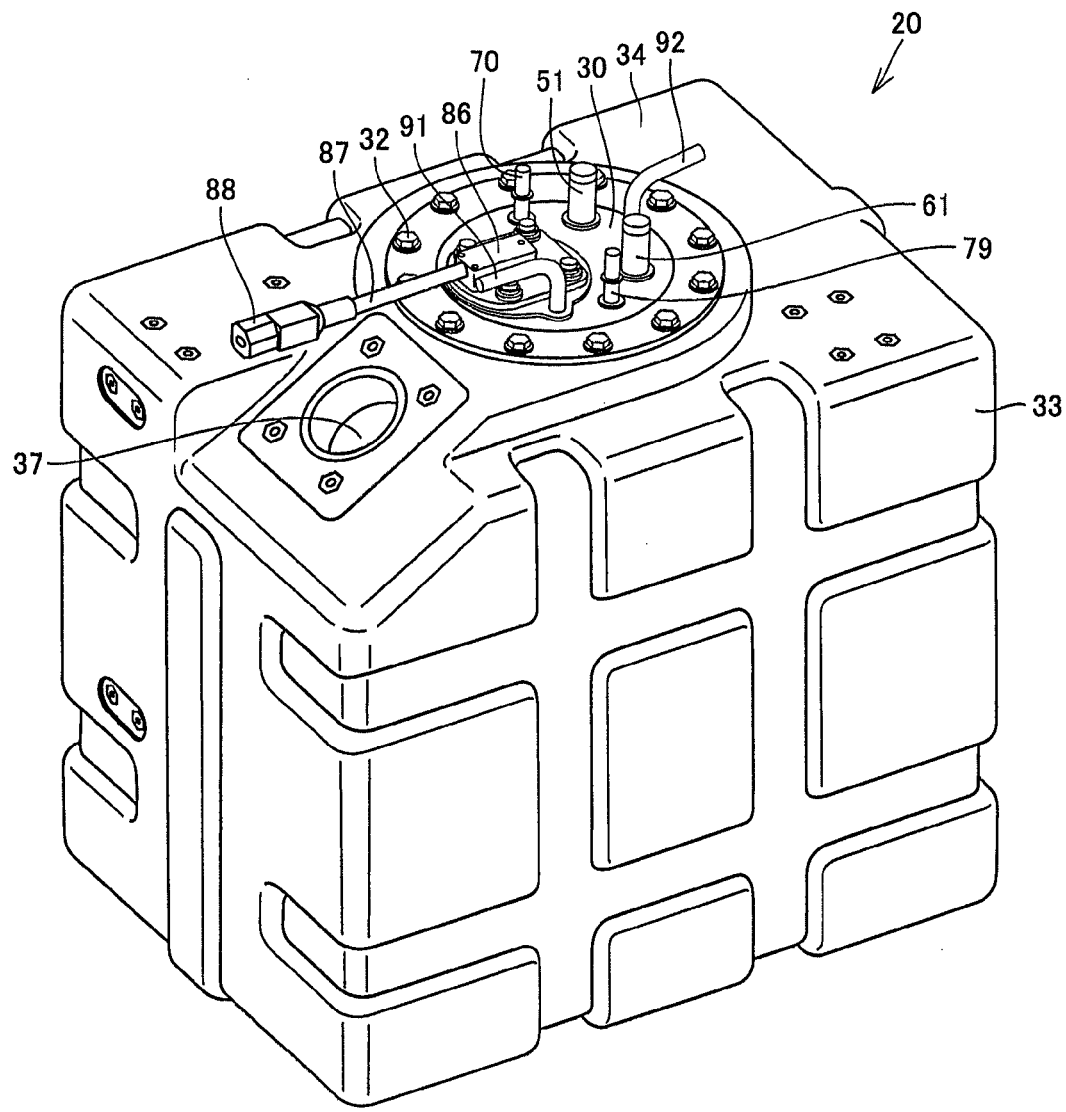
FIG. 4 is a perspective view schematically representing a configuration of the reducing agent tank according to one embodiment of the present invention.

FIG. 4 is a perspective view schematically representing a configuration of the reducing agent tank in one embodiment of the present invention. FIG. 5 is a partially-broken cross-sectional view representing a partially-broken view of the reducing agent tank shown in FIG. 4. Referring to FIGS. 4 and 5, reducing agent tank 20 mainly includes top cover 30, hollow container main body 33, heat exchanger 40, suction pipe 70, sensor unit 80, a heat transfer plate 95, and strainer 100.

Container main body 33 has, for example, an approximately rectangular box-like outer shape. Container main body 33 has a hollow space therein, and has in upper face 34 an opening (not illustrated in the drawings) and a replenishing port 37 communicating with the hollow space. Container main body 33 is formed by resin material such as polyethylene which is superior in corrosion resistance.

The opening (not illustrated in the drawings) formed in upper face 34 of container main body 33 is closed by disc-like top cover 30. Top cover 30 is detachably attached to container main body 33 by means of fastening members 32 (for example, a plurality of bolts). A sealing member such as an O-ring is provided between upper face 34 and top cover 30. Accordingly, the opening is sealed in a liquid-tight manner in the state where top cover 30 is fixed on upper face 34. Top cover 30 is formed of, for example, metal material which is superior in stiffness.

Heat exchanger 40 is located in the hollow space of container main body 33. This heat exchanger 40 has a first pipeline 50 (forward pipe portion) and a second pipeline 60 (return pipe portion) connected one another. Heat exchanger 40 is attached to top cover 30. In other words, each of pipes 51, 61 respectively connected to one end of heat exchanger 40 (an end portion of first pipeline 50) and the other end (an end portion of second pipeline 60) penetrates through top cover 30 so that heat exchanger 40 is fixed on top cover 30. Each of pipes 51, 61 protrudes outside of the hollow space of container main body 33. It should be noted that pipe 51 allows the medium flowing into container main body 33 to pass through, and pipe 61 allows the medium flowing out from container main body 33 to pass through.

Sensor unit 80 is located in the hollow space of container main body 33. Sensor unit 80 has a harness 82, a level sensor 83, and a concentration/temperature sensor 85. Harness 82 and level sensor 83 extend from a lower face of top cover 30 toward bottom face 26 of container main body 33. Concentration/temperature sensor 85 is attached to lower ends of harness 82 and level sensor 83.

Level sensor 83 has a float therein. The float is positioned on a liquid surface of the reducing agent. A level of the reducing agent in the hollow space of container main body 33 can be detected based on height position information of the float. Concentration/temperature sensor 85 measures a concentration and a temperature of the reducing agent. A signal associated with measured values of the level, concentration, and temperature of the reducing agent is transmitted to a base portion 86 via harness 82, and can be outputted to a controller which is not illustrated in the drawings further via harness 87 and connector 88.

Heat transfer plate 95 is provided across both of first pipeline 50 and second pipeline 60 of heat exchanger 40. This heat transfer plate 95 has a flat plate-shaped first flat plate portion 95a, a flat plate-shaped second flat plate portion 95b, and a bent portion 95c which connects first flat plate portion 95a and second flat plate portion 95b. Heat transfer plate 95 is formed by bending one flat plate. First flat plate portion 95a is fixed to first pipeline 50 by welding, for example. Second flat plate portion 95b is fixed to second pipeline 60 by welding, for example.

At a lower end portion of first flat plate portion 95a, a clamp portion 96 is attached. Clamp portion 96 surrounds a periphery of harness 82 and level sensor 83 of sensor unit 80 to support sensor unit 80 on heat transfer plate 95. Heat exchanger 40, heat transfer plate 95, and sensor unit 80 form a three-dimensional support structure. Accordingly, the stiffness of heat exchanger 40 and sensor unit 80 is improved.

Suction pipe 70 penetrates through top cover 30 and extends outward from the hollow space of container main body 33, and is supported by top cover 30. At a lower end of suction pipe 70, a suction port (not illustrated in the drawings) is provided. Strainer 100 is attached to suction pipe 70 so that the internal space of strainer 100 communicates with the suction port. This strainer 100 is attached to support plate 77 through a plate-like support portion 78. This support plate 77 is fixed to bottom face 26 of container main body 33.

Top cover 30 is provided with a return port 79 which penetrates through this top cover 30. This return port 79 is a portion to which return pipe 23 described above (FIG. 3) is connected.

An air vent port 91 and a breather 92 are attached to top cover 30. When the reducing agent is replenished from replenishing port 37 to container main body 33, air which is present in container main body 33 flows out from container main body 33 via air vent port 91. Breather 92 is provided so as to automatically maintain a constant air pressure in container main body 33. When the air present in container main body 33 expands or contracts due to a change in an ambient temperature, air is discharged or taken in via breather 92, so that a constant pressure in container main body 33 can be maintained.

Next, respective configurations of the surrounding portion and the facing portion constituting strainer 100 of the present embodiment will be described with reference to FIGS. 6 to 8.

Figure 5:
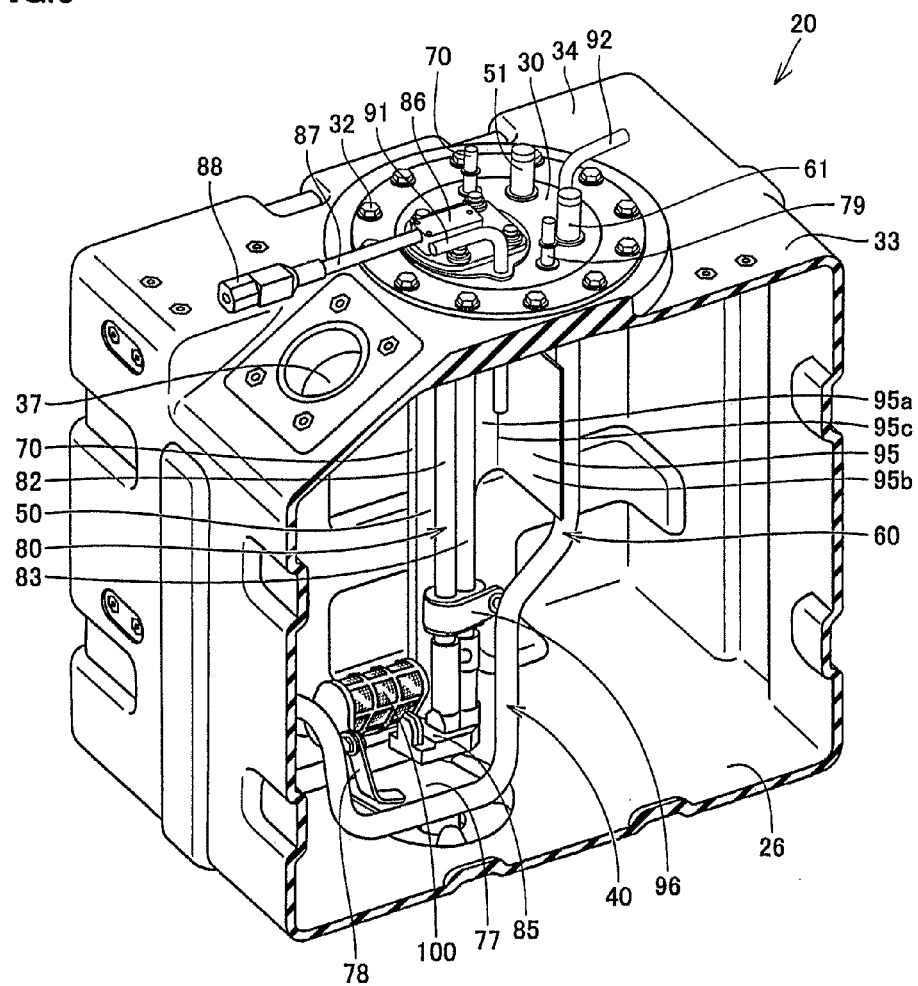
FIG. 5 is a partially-broken cross-sectional view representing a partially-broken view of the reducing agent tank shown in FIG. 4.
Figure 6:
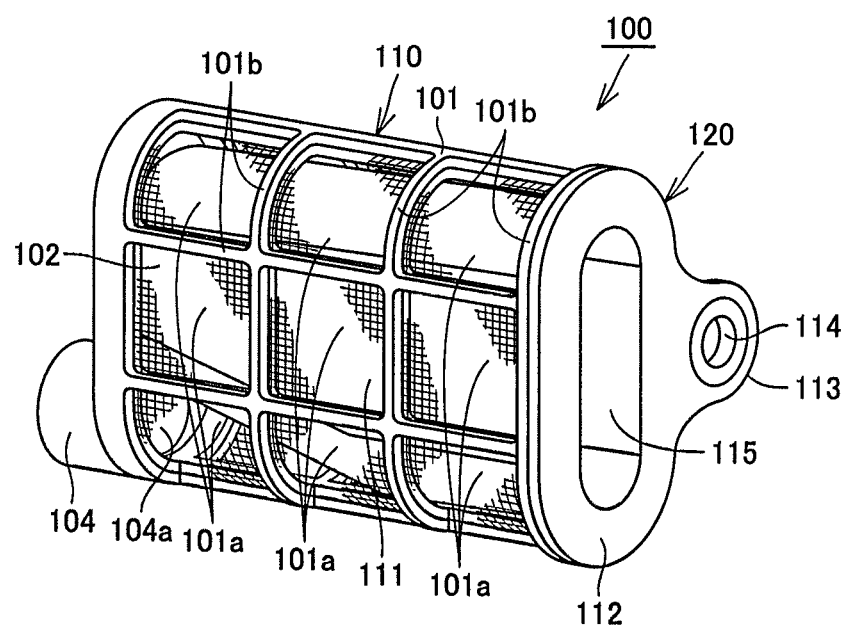
FIG. 6 is a perspective view schematically representing a configuration of the strainer shown in FIG. 5.
Figure 7:
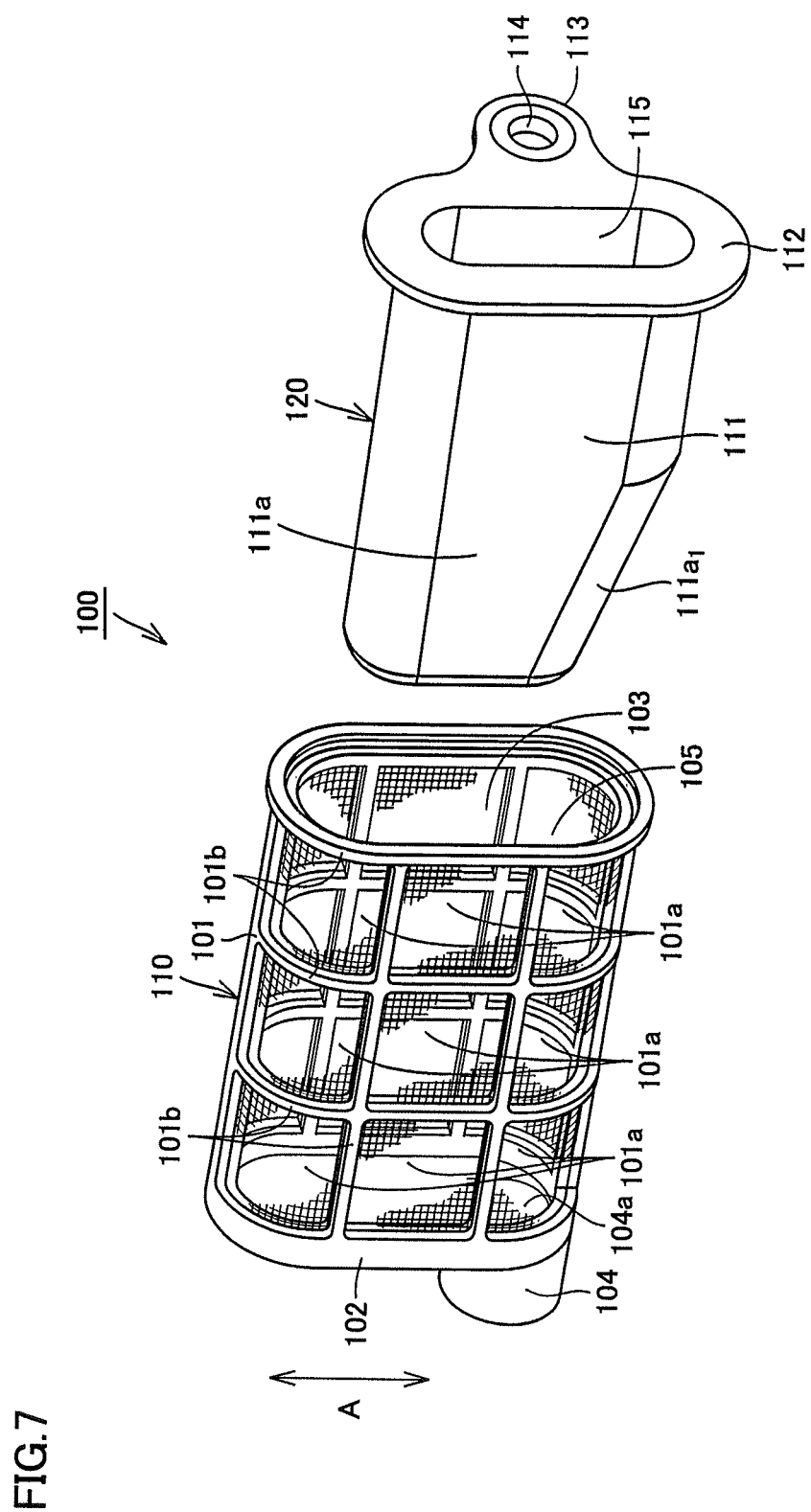
FIG. 7 is an exploded perspective view representing a configuration of the strainer shown in FIG. 6 disassembled into a surrounding portion and a facing portion.

FIGS. 6 and 7 are a perspective view and an exploded perspective view schematically representing the configuration of strainer 100 of the present embodiment shown in FIG. 5. FIG. 8 is a perspective view schematically representing a configuration of the facing portion of the strainer shown in FIG. 7.

Firstly, referring to FIGS. 6 and 7, strainer 100 includes a surrounding portion 110 and a facing portion 120.

Mainly referring to FIG. 7, surrounding portion 110 has such a shape of surrounding an internal space 105 to partition internal space 105 and an external space of strainer 100. For example, surrounding portion 110 has a bottomed cylindrical shape. Surrounding portion 110 having a bottomed cylindrical shape has a peripheral portion 101 surrounding a periphery of internal space 105, and a bottom portion 102 closing one end side of peripheral portion 101. An opening portion 103 is formed on the other end side of peripheral portion 101. In the state where facing portion 120 is not mounted to surrounding portion 110, internal space 105 of surrounding portion 110 is connected to outside of surrounding portion 110 through opening portion 103.

Peripheral portion 101 has a plurality of filter portions (first filter portions) 101a and frame portions 101b. Frame portions 101b surround a periphery of internal space 105 while having a grid shape so as to constitute, for example, a plurality of rectangular opening portions. The plurality of filter portions 101a are arranged respectively at the plurality of rectangular opening portions formed by frame portions 101b.

Each of the plurality of filter portions 101a is configured so as to allow the reducing agent to pass through between internal space 105 and the external space of strainer 100. Each of the plurality of filter portions 101a may have a configuration formed by weaving a plurality of line members to have a mesh, or may have configuration like a non-woven fabric.

Since peripheral portion 101 has not only filter portions 101a but also frame portions 101b, a strength of peripheral portion 101 can be readily secured. Further, peripheral portion 101 may be constituted of only filter portions 101a without having frame portions 101b. Accordingly, peripheral portion 101 can have a simple configuration provided with only filter portions 101a.

Further, taking into consideration the flow rate of the reducing agent, it is preferable that filter portions 101a are positioned entirely on peripheral portion 101. However, taking into consideration the strength of peripheral portion 101, it is preferable that peripheral portion 101 is constituted of a combination of filter portions 101a and frame portions 101b. Further, in the case where a filter portion is further provided on bottom portion 102 of surrounding portion 110, a larger surface area of the filter portion can be secured.

Further, the shape or dimension of each mesh in the plurality of filter portions 101a may be different for each filter portion 101a positioned in each opening portion of each frame portion 101b, or may be the same. The shape of a mesh of filter portion 101a may be any shape such as a triangle, a quadrilateral, a hexagon, an indefinite shape, or the like.

Bottom portion 102 of surrounding portion 110 has a connection portion 104 for connection to suction port 70a (FIG. 3) of suction pipe 70. This connection portion 104 protrudes from bottom portion 102 toward a side of the external space. In connection portion 104, a through hole 104a is formed which penetrates through this connection portion 104 and connects internal space 105 of surrounding portion 110 and the external space. Internal space 105 can communicate with suction port 70a by connecting this through hole 104a to suction port 70a of suction pipe 70. This connection portion 104 is preferably positioned on one side of bottom portion 102 in the longitudinal direction (the direction of the arrow A in FIG. 7).

Figure 8:
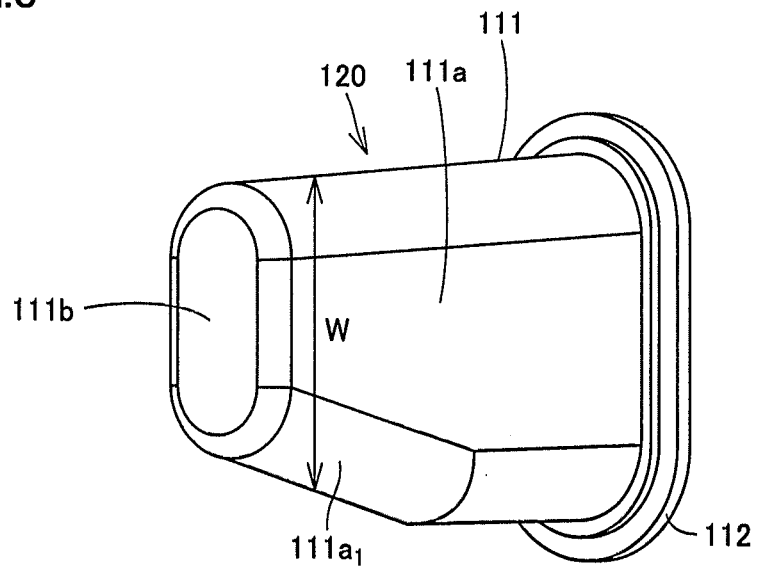
FIG. 8 is a perspective view schematically representing a configuration of the facing portion of the strainer shown in FIG. 7.

Mainly referring to FIGS. 7 and 8, facing portion 120 has a projecting portion 111, a cover portion 112, and a support portion 113. Projecting portion 111 is formed to protrude from a surface of cover portion 112. This projecting portion 111 has a hollow space 115 therein to be hollow. Projecting portion 111 may have a solid structure having no hollow space 115 therein.

Further, projecting portion 111 has a rising portion 111a from cover portion 112 and a leading end portion 111b. On a side of the leading end portion of rising portion 111a, a tapered portion $111a_1$ is provided which is formed such that a dimension W of rising portion 111a is reduced as proceeding from the side of the connection portion with cover portion 112 to the leading end portion.

Support portion 113 is formed to project sideward from cover portion 112. In this support portion 113, a through hole 114 is formed. By inserting a bolt or the like to through hole 114 and fastening plate-like support portion 78 (FIG. 5) and support portion 113 with the bolt and nut, support portion 113 can be supported by plate-like support portion 78.

Next, the configuration in which facing portion 120 is fitted to surrounding portion 110 will be described with reference to FIG. 6 and FIGS. 9 to 14.

Figure 9:
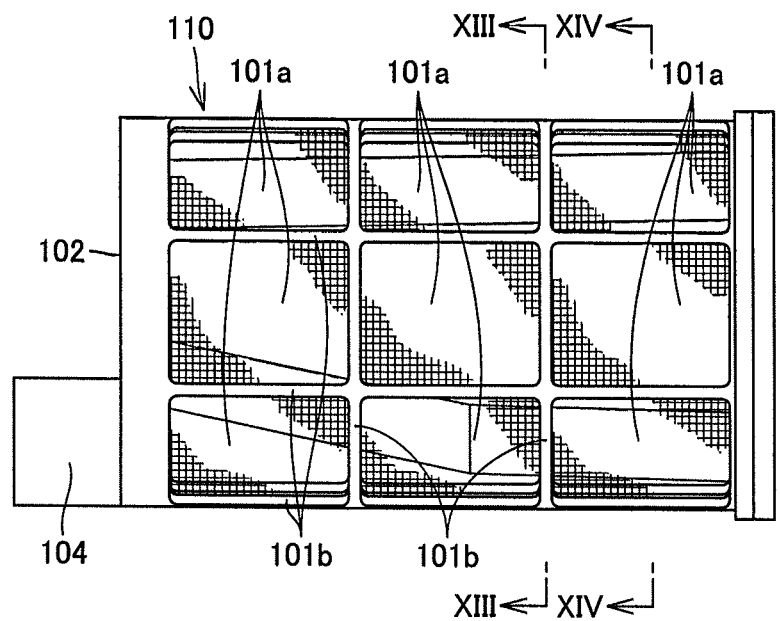
FIG. 9 is a front view schematically representing a configuration of the strainer shown in FIG. 6.
Figure 10:
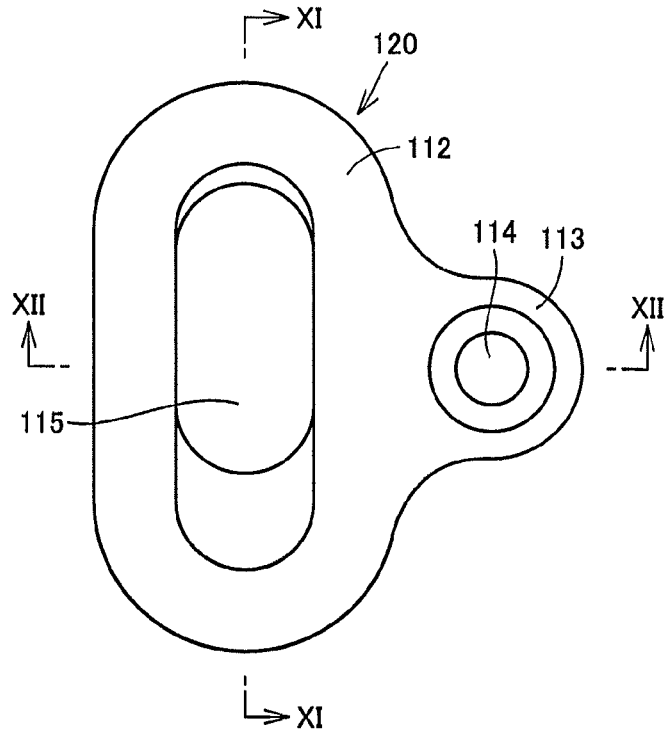
FIG. 10 is a side view schematically representing a configuration of the strainer shown in FIG. 6.
Figure 11:
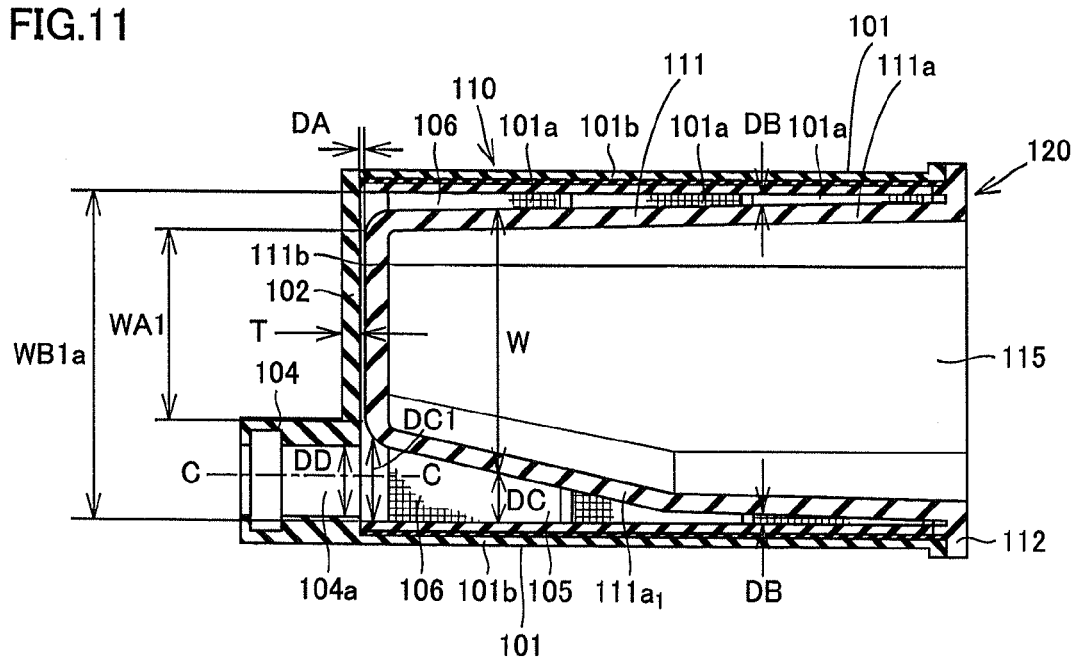
FIG. 11 schematically represents a cross section taken along the XI-XI line of FIG. 10.
Figure 12:
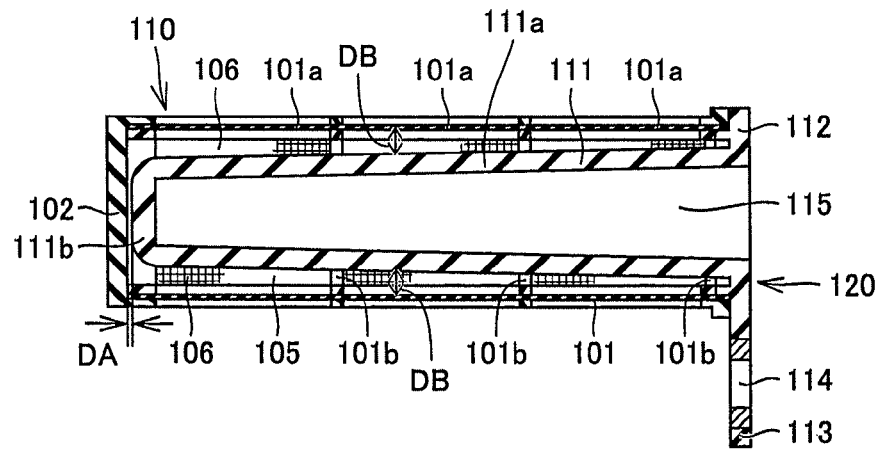
FIG. 12 schematically represents a cross section taken along the XII-XII line of FIG. 10.
Figure 13:
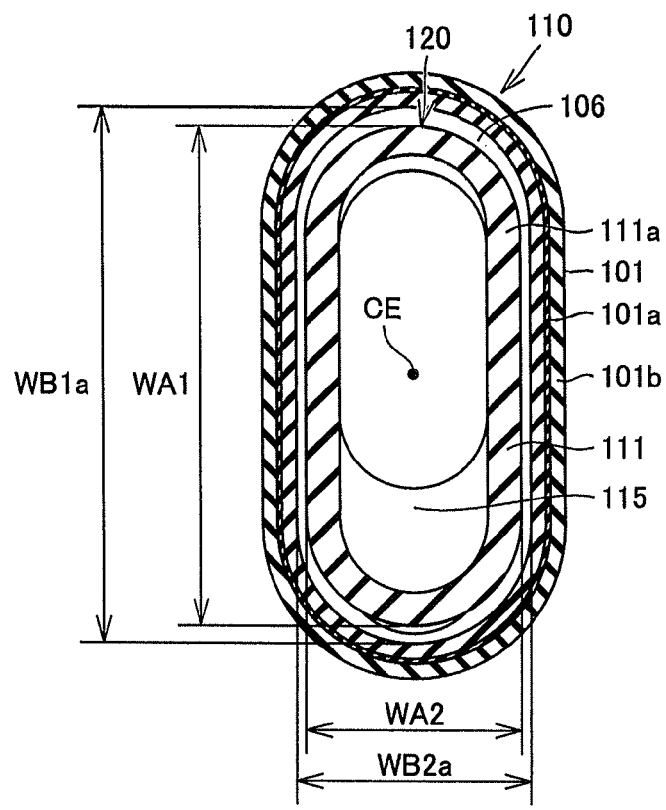
FIG. 13 schematically represents a cross section taken along the XIII-XIII line of FIG. 9.
Figure 14:
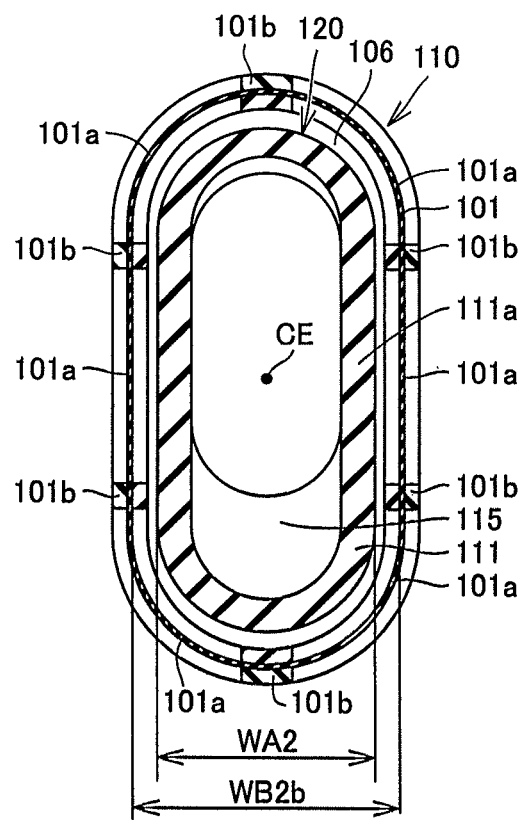
FIG. 14 schematically represents a cross section taken along the XIV-XIV line of FIG. 9.

FIGS. 9 and 10 are a front view and a side view schematically representing the configuration of the strainer according to the present embodiment. FIGS. 11 and 12 schematically represent cross sections taken along XI-XI line and XII-XII line of FIG. 10. FIGS. 13 and 14 schematically represent cross sections taken along XIII-XIII line and XIV-XIV line of FIG. 9.

Referring to FIGS. 6 and 9, in the state where facing portion 120 is fitted into surrounding portion 110, cover portion 112 of facing portion 120 is attached to the other end of surrounding portion 110 to close opening portion 103 (FIG. 7) of surrounding portion 110. Projecting portion 111 of facing portion 120 is connected to cover portion 112, and extends from cover portion 112 into internal space 105 of surrounding portion 110.

Referring to FIGS. 11 to 14, projecting portion 111 extends into internal space 105 of surrounding portion 110, so that projecting portion 111 faces peripheral portion 101 (filter portion 101a and frame portion 101b) and bottom portion 102 in internal space 105 through gap space 106. Gap space 106 is positioned between a whole circumference of projecting portion 111, from the portion at which projecting portion 111 is connected to cover portion 112 to leading end portion 111b of projecting portion 111, and peripheral portion 101, and between leading end portion 111b and bottom portion 102. Further, projecting portion 111 partitions gap space 106 and the external space of strainer 100.

Referring to FIGS. 11 and 12, leading end portion 111b of projecting portion 111 extends to a position close to bottom portion 102. Specifically, a dimension DA of gap space 106 between leading end portion 111b of projecting portion 111 and bottom portion 102 is smaller than, for example, a thickness T of bottom portion 102.

Further, a dimension DB of gap space 106 between rising portion 111a of projecting portion 111 and peripheral portion 101 (filter portion 101a and frame portion 101b) is gradually increased as proceeding from a side of the connection portion between projecting portion 111 and cover portion 112 to leading end portion 111b.

Further, a dimension DC of gap space 106 between tapered portion $111a_1$ of rising portion 111a and peripheral portion 101 is increased as proceeding toward a side of leading end portion 111b. In other words, facing portion 120 has a tapered portion $111a_1$ which is shaped such that dimension DC of gap space 106 between peripheral portion 101 of surrounding portion 110 and facing portion 120 is increased as coming closer to through hole 104a along the extending direction of through hole 104a (direction along a dot and dash line C).

A rate of increase in dimension DC of gap space 106 between this tapered portion $111a_1$ and peripheral portion 101 is higher than a rate of increase in dimension DB of gap space 106 between rising portion 111a at a part other than tapered portion $111a_1$ and peripheral portion 101. Further, dimension DC1 of gap space 106 between tapered portion $111a_1$ at a portion of facing with through hole 104a and peripheral portion 101 (in other words, near leading end portion 111b) has a dimension larger than or equal to diameter DD of through hole 104a.

Further, as shown in FIG. 11, since through hole 104a communicates with gap space 106, suction port 70a can communicate with gap space 106 by connecting this through hole 104a to suction port 70a (FIG. 3) of suction pipe 70.

Referring to FIGS. 13 and 14, gap space 106 is formed also between rising portion 111a of projecting portion 111 and peripheral portion 101 (filter portions 101a and frame portions 101b). This gap space 106 is formed on a whole circumference of rising portion 111a.

Referring to FIG. 14, filter portions 101a of peripheral portion 101 are arranged so as to surround a periphery of gap space 106. In the case where frame portion 101b is present, filter portions 101a and frame portions 101b are arranged alternately to surround the periphery of gap space 106. Further, in the case where frame portions 101b are omitted, filter portions 101a surround a periphery of gap space 106 along the whole circumference.

The dimension of projecting portion 111 in a radial direction is preferably larger than or equal to a half of the dimension of peripheral portion 101 in the radial direction. The dimension in the radial direction means a dimension in a radiation direction from a weight center CE in the cross section of strainer 100 taken along a plane perpendicular to the extending direction of projection portion 111 from cover portion 112 as shown in FIG. 13. This weight center CE means a weight center of the cross-sectional shape assuming that a mass distribution is uniform in the cross-sectional shape of internal space 105. Further, the radial direction means all of the directions passing through weight center CE.

Specifically, referring to FIG. 13, in the case where the radial direction is the longitudinal direction in the cross-sectional shape of internal space 105, dimension WA1 of projecting portion 111 in the radial direction is preferably larger than or equal to a half of dimension WB1a of peripheral portion 101 in the radial direction. Further, in the case where the radial direction is the short direction in the cross-sectional shape of internal space 105, dimension WA2 of projecting portion 111 in the radial direction is preferably larger than or equal to a half of dimension WB2a of peripheral portion 101 in the radial direction.

In the description above, the dimension in the radial direction of the cross-sectional shape defined by frame portions 101b of peripheral portion 101 is described. This similarly applies to the dimension in the radial direction of the cross-sectional shape defined by filter portion 101a of peripheral portion 101. Specifically referring to FIG. 14, in the case where the radial direction is a short direction in the cross-sectional shape of internal space 105, dimension WA of projecting portion 111 in the radial direction is preferably larger than or equal to a half of dimension WB2$b$ in the radial direction defined by filter portion 101$a$ of peripheral portion 101.

Further, as shown in FIG. 11, also as to the portion of projecting portion 111 provided with tapered portion 111$a_1$, the dimension of projecting portion 111 in the radial direction is preferably larger than or equal to a half of the dimension of peripheral portion 101 in the radial direction. Specifically, in the case where the radial direction is the longitudinal direction in the cross-sectional shape of internal space 105, dimension WA1 of leading end portion 111$b$ provided with tapered portion 111$a_1$ in the radial direction is preferably larger than or equal to a half of dimension WB1$a$ of peripheral portion 101 in the radial direction.

In the description above, the case is described in which the dimension in the radial direction is the dimension in the longitudinal direction or short direction of the cross-sectional shape of internal space 105. However, the dimension in the radial direction is all necessary to be the dimension passing through weight center CE even in the direction other than the longitudinal direction and the short direction.

Further, it is preferable that projecting portion 111 comes close to peripheral portion 101 and bottom portion 102 so that gap space 106 is reduced to be as small as possible. It is preferable that an outer circumferential surface of rising portion 111$a$ comes close to an inner circumferential surface of peripheral portion 101, and a surface of leading end portion 111$b$ comes close to a surface of bottom portion 102.

Figure 15:
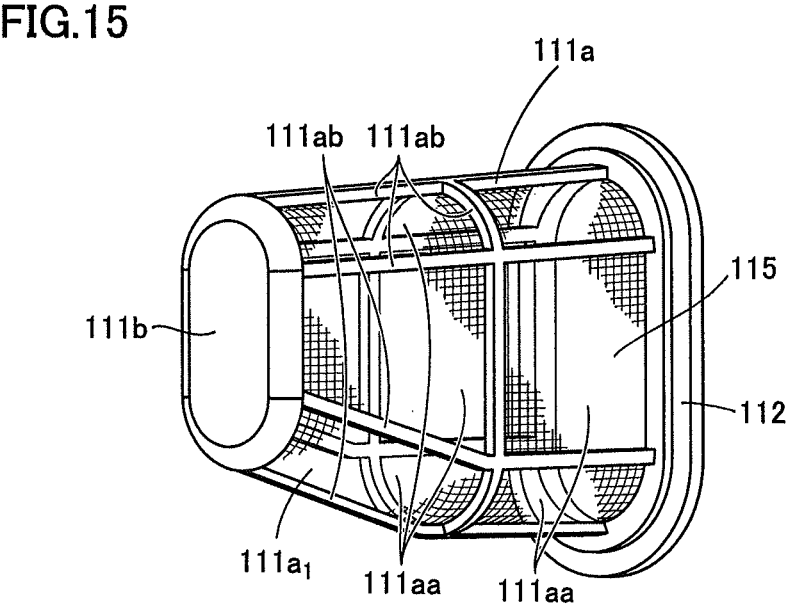
FIG. 15 is a perspective view schematically representing a configuration of the facing portion as a modified example of the reducing agent tank according to one embodiment of the present invention.

As shown in FIG. 15, facing portion 120 may have a filter portion (second filter portion) 111 as which allows reducing agent 90 to pass through between gap space 106 and strainer 100. Specifically, rising portion 111$a$ has a plurality of filter portions 111$aa$ and frame portions 111$ab$.

Frame portions 111$ab$ surround a periphery of hollow space 115 while having a grid shape so as to configure a plurality of rectangular opening portions, for example. The plurality of filter portions 111$aa$ are arranged respectively at the plurality of rectangular opening portions formed by frame portions 111$ab$. Each of the plurality of filter portions 111$aa$ is configured to allow the reducing agent to pass through between gap space 106 and the external space of strainer 100.

Rising portion 111$a$ may be constituted of only filter portions 111$aa$ without having frame portions 111$ab$. Further, leading end portion 111$b$ of projecting portion 111 may have filter portions.

The configuration of facing portion 120 shown in FIG. 15 other than those described above is substantially the same as the configuration of the facing portion shown in FIGS. 7 and 8. Therefore, the same elements have the same reference numerals allotted, and description thereof will not be repeated.

Next, the effect of the present embodiment will be described with a comparison with the configuration of Comparative Example shown in FIG. 16.

Figure 16:
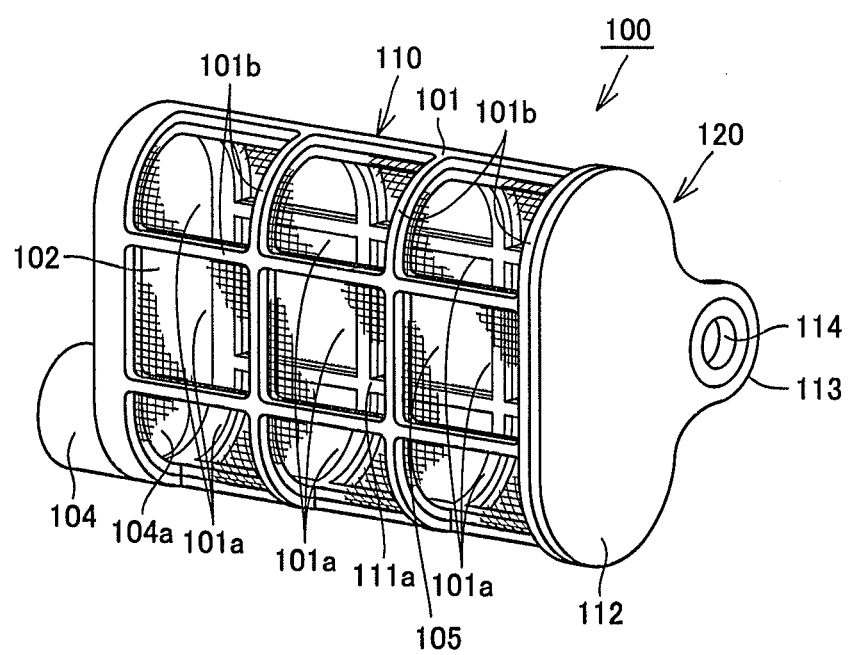
FIG. 16 is a perspective view schematically representing a configuration of Comparative Example.

Referring to FIG. 16, there is a difference that in the configuration of strainer 100 of Comparative Example, as compared to the configuration of the present embodiment shown in FIGS. 6 and 7, facing portion 120 does not have projecting portion 111, and is constituted of a flat plate-like cover portion 112 and support portion 113 projecting sideward from cover portion 112. Configuration of the Comparative Example other than those described above is substantially the same as the configuration of the present embodiment shown in FIGS. 6 and 7. Therefore, the same elements have the same reference numerals allotted, and description thereof will not be repeated.

In the configuration of Comparative Example, projecting portion 111 is not provided unlike the present embodiment. Therefore, internal space 105 of strainer 100 is larger than gap space 106 of the present embodiment. Therefore, when the purge process is performed in reducing agent tank 20 provided with strainer 100 as shown in FIG. 3, a large amount of bubbles remain in strainer 100. Therefore, when reducing agent 90 is sucked into suction pipe 70 at the time of restarting engine 10, a large amount of bubbles are sucked into suction pipe 70, thus the suction defect of reducing agent 90 into suction pipe 70 may occur, thereby causing the operation defect of reducing agent pump 22.

When an attempt is made to simply reduce the volume of internal space 105 of strainer 100 according to Comparative Example to suppress the suction defect, the surface area of filter portion 101$a$ is reduced, so that the flow rate of reducing agent 90 is affected.

On the other hand, according to strainer 100 of the present embodiment, as shown in FIGS. 11 to 14, facing portion 120 extends into internal space 105 of surrounding portion 110. Accordingly, the volume of gap space 106 sandwiched between facing portion 120 and surrounding portion 110 can be reduced more than Comparative Example. Therefore, the amount of bubbles remaining in gap space 106 of strainer 100 during the purge process can be reduced. Thus, when reducing agent 90 is sucked into suction port 70$a$ at the time of restarting the engine, suction of a large amount of bubbles into suction port 70$a$ can be suppressed, so that the suction defect of reducing agent 90 can be suppressed.

Further, it is all necessary to extend facing portion 120 into internal space 105 of surrounding portion 110 to reduce the volume of gap space 106 in order to suppress the suction defect, and there is no need to reduce the size of surrounding portion 110 itself. Therefore, a large surface area of filter portion 101$a$ formed in surrounding portion 110 can be secured so that the flow rate of reducing agent 90 is not affected.

Further, since the current size ban be maintained as described above, it is possible to secure a large surface area of the filter portion with a compact size while suppressing the suction defect.

Further, securing a large surface area of the filter portion can extend the life of the filter.

Further, as shown in FIG. 14, filter portion 101$a$ is arranged so as to surround a periphery of gap space 106. Accordingly, an area of filter portion 101$a$ can be further increased.

Further, as shown in FIG. 11, since dimension DA of the gap space between leading end portion 111$b$ and bottom portion 102 is smaller than a thickness T of bottom portion 102, dimension DA of the gap space between leading end portion 111$b$ and bottom portion 102 can be reduced.

Further, as shown in FIGS. 13 and 14, the dimension of projecting portion 111$a$ in the radial direction is larger than or equal to a half of the dimension of the peripheral direction in the radial direction. Accordingly, the volume of the gap space can be reduced.

Further, as shown in FIG. 11, facing portion 120 has a tapered portion 111$a_1$ which is so shaped that size DC of gap space between surrounding portion 110 and facing portion 120 is increased as coming closer to through hole 104$a$ along the extending direction of through hole 104$a$ (direction along the dot and dash line C). Accordingly, a flow path resistance of reducing agent 90 near through hole 104$a$ connected to suction port 70$a$ can be reduced, so that reducing agent 90 can flow into suction port 70$a$ smoothly.

Further, as shown in FIG. 15, when facing portion 120 has filter portion 111 as which allows reducing agent 90 to pass through between gap space 106 and the external space of strainer 100, a whole area of the filter portion can be increased by the size of filter portion 111aa.

According to work vehicle 1 of the present embodiment shown in FIGS. 1 and 2, since reducing agent tank 20 of the present embodiment shown in FIGS. 4 to 14 is provided, the suction defect of reducing agent 90 can be suppressed, and there is no effect on the flow rate of reducing agent 90 due to reduction of surface area of filter portion 101a. Therefore, the reductive reaction of the exhaust gas in exhaust gas treatment device 14 can be performed more appropriately.

It should be understood that the embodiment disclosed herein is illustrative and non-restrictive in every respect. The scope of the present invention is defined by the terms of claims, rather than the description of the embodiments set forth above, and is intended to include any modifications within the scope and meaning equivalent to the terms of the claims.

REFERENCE SIGNS LIST 1 work vehicle (hydraulic excavator); 2 lower travelling unit; 2a crawler belts; 3 upper revolving unit; 4 work implement; 4a boom; 4b arm; 4c bucket; 4d hydraulic cylinder; 5 cab; 6 engine compartment; 7 counter weight; 8 engine hood; 9 revolving frame; 10 engine; 11, 13 exhaust pipe; 12 exhaust gas treatment device (diesel particulate filter device); 13 intermediate connection pipe (mixing pipe); 14 exhaust gas treatment device (selective catalytic reduction device); 15 exhaust pipe; 16 radiator; 17, 18 cooling water pipe; 19 cooling water pump; 20 reducing agent tank; 21 feed pipe; 22 reducing agent pump; 25 pressure feed pipe; 26 bottom face; 28 injection device; 30 top cover; 31 opening; 32 fastening member; 33 container main body; 34 upper face; 37 replenishing port; 40 heat exchanger; 50 first pipeline; 60 second pipeline; 70 suction pipe; 70a suction port; 77 support plate; 78 plate-like support portion; 79 return port; 80 sensor unit; 82, 87 harness; 83 level sensor; 85 thermometer; 86 base portion; 88 connector; 90 reducing agent; 91 air vent port; 92 breather; 95 heat transfer plate; 95a first flat plate portion; 95b second flat plate portion; 95c bent portion; 96 clamp portion; 100 strainer; 101 peripheral portion; 101a, 111 as filter portion; 101b, 111ab frame portion; 102 bottom portion; 103 opening portion; 104 connection portion; 104a, 114 through hole; 105 internal space; 106 gap space; 110 surrounding portion; 111 projecting portion; 111a rising portion; 111a$_1$ tapered portion; 111b leading end portion; 112 cover portion; 113 support portion; 115 hollow space; 120 facing portion.

The invention claimed is:

1. A reducing agent tank comprising:
a container main body which stores a reducing agent;
a pipe which includes a suction port positioned in said container main body and guides said reducing agent from said suction port to outside of said container main body; and
a strainer which is provided at said suction port of said pipe,
said strainer includes:
a surrounding portion having a first filter portion which surrounds an internal space of said strainer to partition said internal space and an external space of said strainer and allows said reducing agent to pass through between said internal space and said external space; and
a facing portion which extends into said internal space of said strainer to face with said first filter portion through a gap space communicating with said suction port in said internal space and partition said gap space and said external space, wherein
said surrounding portion has a peripheral portion which surrounds a periphery of said internal space, and a bottom portion which closes a first end of said peripheral portion, and
an opening portion is formed at a second end of said peripheral portion, and
said facing portion has a cover portion which is attached to said second end, and a projecting portion which extends from said cover portion into said internal space, and
said gap space is positioned between a Whole circumference of said projecting portion from a portion at which said projecting portion is connected to said cover portion to a leading end portion of said projecting portion and said peripheral portion, and between said leading end portion and said bottom portion, and
a dimension of said gap space between said leading end portion and said bottom portion is smaller than a thickness of said bottom portion.

2. The reducing agent tank according to claim 1, wherein said first filter portion is arranged so as to surround a periphery of said gap space.

3. The reducing agent tank according to claim 1, wherein a dimension of said projecting portion in a radial direction is larger than or equal to a half of a dimension of said peripheral portion in a radial direction.

4. A work vehicle, comprising:
an engine;
an exhaust gas treatment device which performs treatment to an exhaust gas from said engine by a reductive reaction;
a reducing agent tank comprising:
a container main body which stores a reducing agent;
a pipe which includes a suction port positioned in said container main body and guides said reducing agent from said suction port to outside of said container main body; and
a strainer which is provided at said suction port of said pipe,
said strainer includes:
a surrounding portion having a first filter portion which surrounds an internal space of said strainer to partition said internal space and an external space of said strainer and allows said reducing agent to pass through between said internal space and said external space; and
a facing portion which extends into said internal space of said strainer to face with said first filter portion through a gap space communicating with said suction port in said internal space and partition said gap space and said external space, wherein
said surrounding portion has a peripheral portion which surrounds a periphery of said internal space, and a bottom portion which closes a first end of said peripheral portion, and
an opening portion is formed at a second end of said peripheral portion, and
said facing portion has a cover portion which is attached to said second end, and a projecting portion which extends from said cover portion into said internal space, and
said gap space is positioned between a whole circumference of said projecting portion from a portion at which said projecting portion is connected to said cover portion to a leading end portion of said projecting portion and said peripheral portion, and between said leading end potion and said bottom portion, and a dimension of said gap space between said leading end portion and said bottom portion is smaller than a thickness of said bottom portion; and a reducing agent injection device which injects said reducing agent sucked out from said reducing agent tank to said exhaust gas guided to said exhaust gas treatment device.

5. A reducing agent tank comprising:

a container main body which stores a reducing agent;

a pipe which includes a suction port positioned in said container main body and guides said reducing agent from said suction port to outside of said container main body; and a strainer which is provided at said suction port of said pipe, said strainer includes:

a surrounding portion having a first filter portion which surrounds an internal space of said strainer to partition said internal space and an external space of said strainer and allows said reducing agent to pass through between said internal space and said external space; and a facing portion which extends into said internal space of said strainer to face with said first filter portion thorough a gap space communicating with said suction port in said internal space and partition said gap space and said external space, said surrounding portion having a through hole which connects said suction port and said gap space, and said facing portion having a tapered portion which is so shaped that a size of said gap space between said surrounding portion and said facing portion increases as proceeding closer to said through hole along an extending direction of said through hole, wherein said surrounding portion has a peripheral portion which surrounds a periphery of said internal space, and a bottom portion which closes a first end of said peripheral portion, and an opening portion is formed at a second end of said peripheral portion, and said facing portion has a cover portion which is attached to said second end, and a projecting portion Which extends from said cover portion into said internal space, and said gap space is positioned between a whole circumference of said projecting portion from a portion at which said projecting portion is connected to said cover portion to a leading end portion of said projecting portion and said peripheral portion, and between said leading end portion and said bottom portion, and a dimension of said gap space between said leading end portion and said bottom portion is smaller than a thickness of said bottom portion.

6. The reducing agent tank according to claim 5, wherein said facing portion has a second filter portion which allows said reducing agent to pass through between said gap space and said external space.

7. The reducing agent tank according to claim 5, wherein said first filter portion is arranged so as to surround a periphery of said gap space.

8. The reducing agent tank according to claim 5, wherein a dimension of said projecting portion in a radial direction is larger than or equal to a half of a dimension of said peripheral portion in a radial direction.

9. A work vehicle, comprising:

an engine;

an exhaust gas treatment device which performs treatment to an exhaust gas from said engine by a reductive reaction;

a reducing agent tank comprising:

a container main body which stores a reducing agent;

a pipe which includes a suction port positioned in said container main body and guides said reducing agent from said suction port to outside of said container main body; and a strainer which is provided at said suction port of said pipe, said strainer includes:

a surrounding portion having a first filter portion which surrounds an internal space of said strainer to partition said internal space and an external space of said strainer and allows said reducing agent to pass through between said internal space and said external space; and a facing portion which extends into said internal space of said strainer to face with said first filter portion thorough a gap space communicating with said suction port in said internal space and partition said gap space and said external space, said surrounding portion having a through hole which connects said suction port and said gap space, and said facing portion having a tapered portion which is so shaped that a size of said gap space between said surrounding portion and said facing portion increases as proceeding closer to said through hole along an extending direction of said through hole, wherein said surrounding portion has a peripheral portion which surrounds a periphery of said internal space, and a bottom portion which closes a first end of said peripheral portion, and an opening portion is formed at a second and of said peripheral portion, and said facing portion has a cover portion which is attached to said second end, and a projecting portion which extends from said cover portion into said internal space, and said gap space is positioned between a whole circumference of said projecting portion from a portion at which said projecting portion is connected to said cover portion to a leading end portion of said projecting portion and said peripheral portion, and between said leading end portion and said bottom portion, and a dimension of said gap space between said leading end portion and said bottom portion is smaller than a thickness of said bottom portion; and a reducing agent injection device which injects said reducing agent sucked out from said reducing agent tank to said exhaust gas guided to said exhaust gas treatment device.

* * * * *